Figure 1:
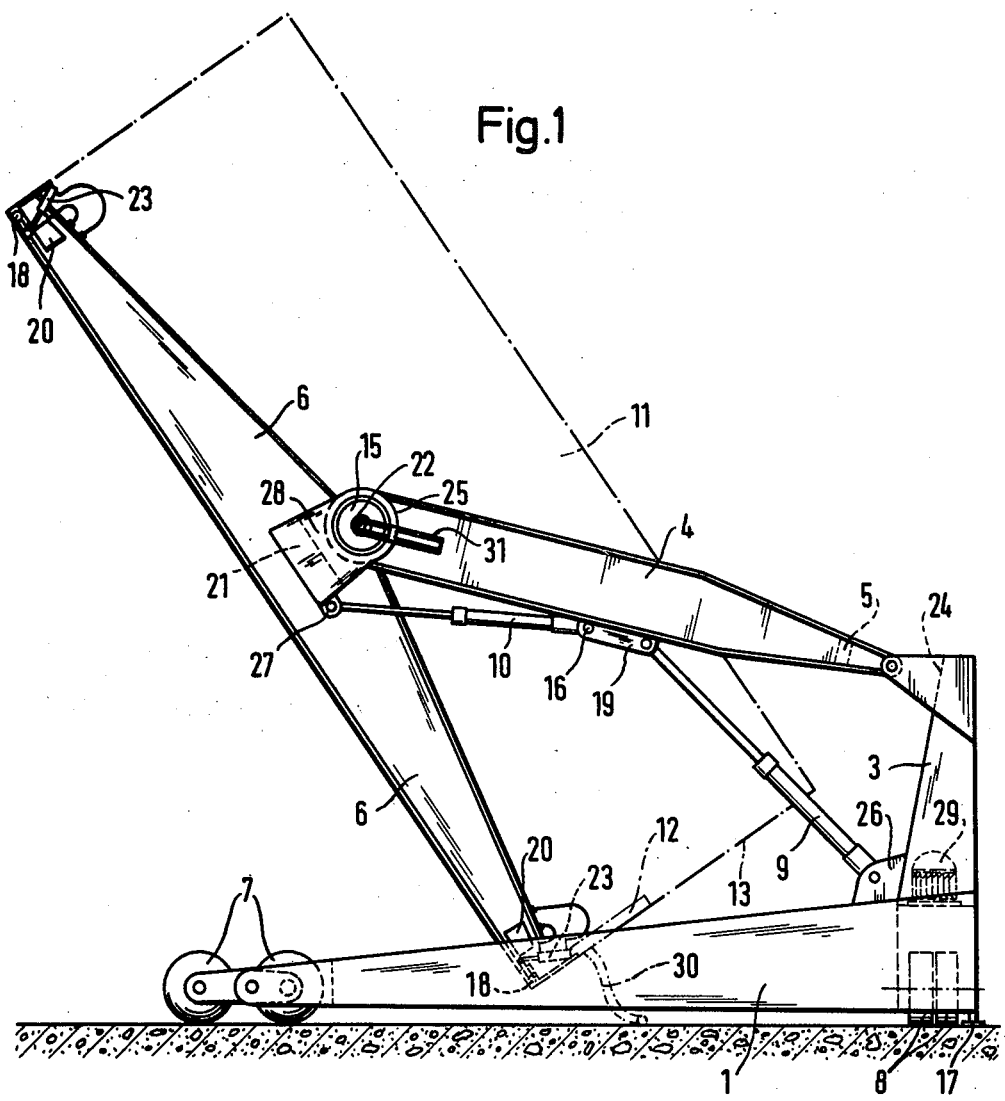

United States Patent [19]

Gerhard

[11] 4,095,708
[45] Jun. 20, 1978

[54] REVERSING DEVICE FOR HOISTING AND TIPPING FREIGHT CONTAINERS

[75] Inventor: Helmut Gerhard, Weitefeld, Sieg, Germany

[73] Assignee: Westerwälder Eisenwerk Gerhard GmbH, Germany

[21] Appl. No.: 624,927

[22] Filed: Oct. 22, 1975

[30] Foreign Application Priority Data

Oct. 23, 1974 Germany .............................. 2450420

[51] Int. Cl.² ............................................ B65G 65/04
[52] U.S. Cl. .................. 214/313; 214/1 Q; 214/390
[58] Field of Search ............... 214/390, 392, 394, 396, 214/312, 313, 314, 1 Q; 212/9; 105/366 C

[56] References Cited

U.S. PATENT DOCUMENTS

| | | | |
|---|---|---|---|
| 1,481,305 | 1/1924 | Smith | 105/366 C |
| 1,753,756 | 4/1930 | Small | 214/313 |
| 2,267,355 | 12/1941 | Van Riper | 214/313 |
| 2,281,183 | 4/1942 | Dempster | 214/313 |
| 2,695,718 | 11/1954 | Epps | 214/333 |
| 2,716,501 | 8/1955 | Geiger | 214/313 |
| 2,789,648 | 4/1957 | Huffman | 214/672 |
| 2,903,238 | 9/1959 | Flandrick | 214/75 H |
| 3,049,253 | 8/1962 | Cabral | 214/332 |
| 3,556,580 | 1/1971 | Bridge | 294/81 SF |
| 3,834,667 | 9/1974 | Sanger | 214/390 |
| 3,899,205 | 8/1975 | Lanigan et al. | 294/81 SF |
| 3,902,616 | 9/1975 | Santic | 214/313 |

FOREIGN PATENT DOCUMENTS

| | | | |
|---|---|---|---|
| 1,761,831 | 12/1970 | Germany | 214/315 |
| 1,164,112 | 9/1969 | United Kingdom | 214/313 |

*Primary Examiner*—Lawrence J. Oresky
*Attorney, Agent, or Firm*—Craig & Antonelli

[57] ABSTRACT

For charging and discharging a freight container, a device for tipping the container has a U-shaped frame, to which two tipping cheeks are connected which are adapted to be raised and lowered together and to pivot and which have rotary locking devices for engaging the lower corner fittings of the freight container. The device can be mobile and self-propelled or towable, is collapsable into a relatively small space when not in use and has hydraulic thrust and tipping actuators.

50 Claims, 7 Drawing Figures

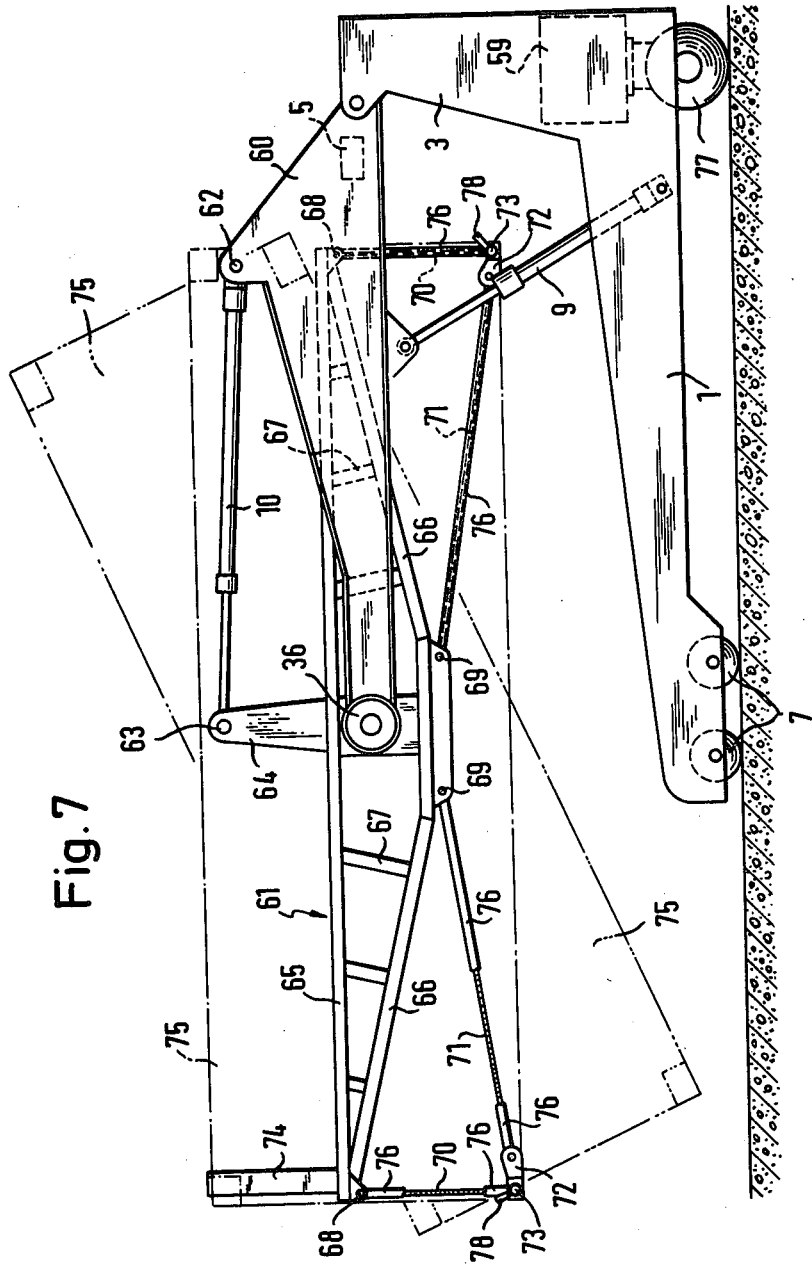

REVERSING DEVICE FOR HOISTING AND TIPPING FREIGHT CONTAINERS

The invention relates to a reversing device for hoisting and tipping freight containers of different kinds, which comply with the ISO regulations, particularly for stationary reversal of liquid-, gas-, bulk material- and piece goods containers and for discharging pressure- and non-pressure bulk material containers by tipping, and also for charging the latter without opening the lid.

The application of special containers for bulk materials and liquids in the chemical, foodstuffs- and beverage industry is frequently frustrated by the non-availability in these factories of heavy lifting tackle for depositing, let alone tipping, such containers.

Apart from heavy dock- and railway trains, the only reversing devices known so far as trestles and loading gantries with mechanical, hydraulic or pneumatic drive, which lift the freight container horizontally off the vehicle, and mobile gantry cranes (portal thrust trucks). The trestles and loading gantries only enable the parallel displacement of the container, but cannot perform tipping- or pivotal movements. The portal thrust trucks are also only capable of providing a limited pivotal movement; moreover their costs are exceptionally high and, on account of their structural height, they cannot normally be used under cover.

The object of the invention is the provision of a reversing device, which is capable of lifting a container off a vehicle and of bringing it into any desired tipping position for discharging bulk material without further reversal, or also bringing it into a vertical position, as well as being capable of depositing it in a horizontal or vertical position on the floor or a platform, without the need of further extensive reversal operations and the application of additional equipment.

For the purpose of fulfilling this object, the reversing device embodying the invention comprises a horizontal U-shaped frame comprising two lateral cantilevers and a transverse beam and tipping cheeks which are connected to this frame, adapted to be raised and lowered together in mutually parallel relationship, pivotable about an axis which is parallel to the transverse beam and provided at their ends with engaging means for engaging the lower corner fittings of a freight container located between the tippng cheeks.

A lorry laden with a container can drive into the opening in the frame formed by the two cantilevers.

Upon entry of the lorry, the tipping cheeks are brought to the correct height and their ends with the engaging means (preferably rotary locking devices, i.e., rotary non-round stubs) are presented to the container on both sides in such a way that the engaging means engage laterally into the standardised lower corner fittings of the freight container standing on the lorry. After the rotary locking devices have been latched, the container may be lifted off the vehicle and, after the latter has been driven out, it can be held and deposited horizontally or in any desired oblique position or upright.

Tank containers for liquids and gases may, depending on the position and nature of the connections, be charged and discharged lying down or standing up. Normal containers for piece goods may be stacked and discharged at ground level without a ramp or loading gantry. Pressure tight bulk material containers are pneumatically discharged and charged inwards or outwards in the tilted position appropriate to the material. Non-pressurized bulk material containers, i.e. normal piece goods containers, with doors at their ends, may be charged in a vertical position in the case of upwardly open doors without any pouring losses, with or without a plastic inlet. Additional interior walls are not necessary. For discharging, these containers are tipped inwards or outwards and discharged through frontal apertures or the wholly or partially open frontal doors. At any time the tip-discharging can be suitably metered or interrupted by upward pivoting.

The device described fulfils the above-mentioned object at economically acceptable cost and thus makes a substantial contribution to extending the transport chain in a single freight container from the location at which the goods are produced via rail, road or ship and internal transport, intermediate- and final storage up to the further processing or the complete or partial discharging at the user location. Thereby, apart from the known advantages of the combined freight container traffic, additional considerable savings are achieved, e.g. during pump-recirculation, cleaning, with regard to stationary storage containers, vehicle waiting times and internal transport.

Figure 2:
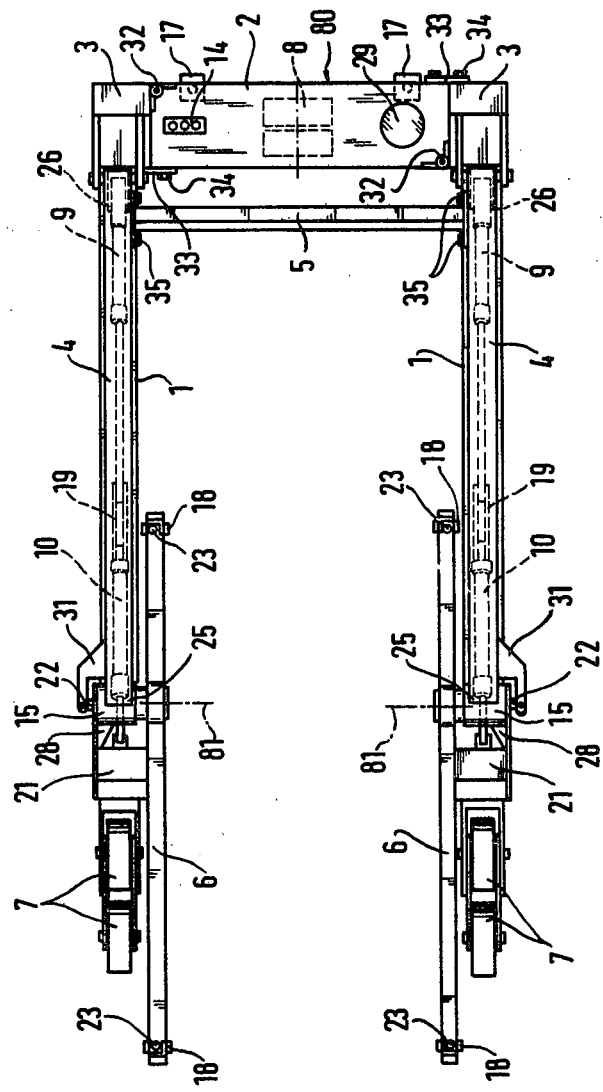
Figure 3:
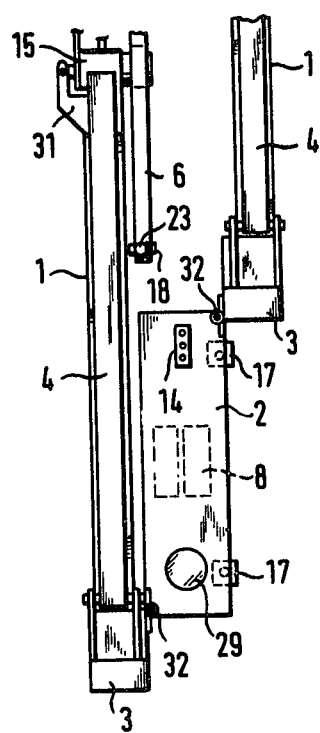
Figure 4:
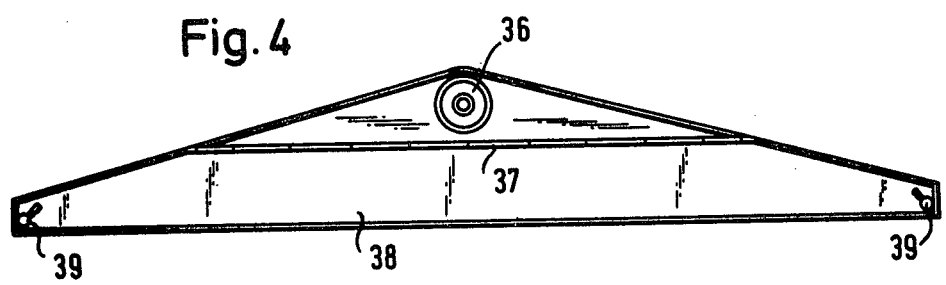
Figure 5:
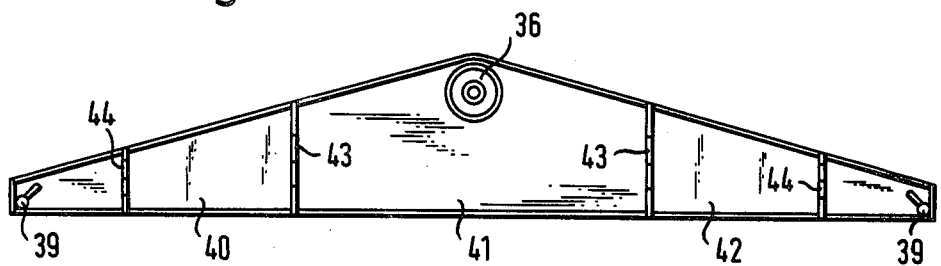
Figure 6:
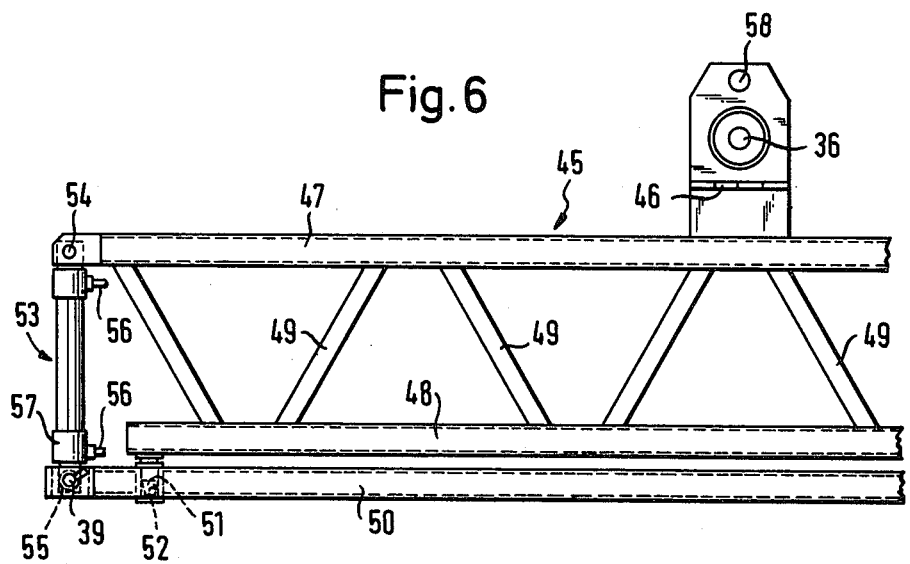

Some exemplary embodiments of the invention will now be described with reference to the drawing, in which FIG. 1 is a side view and FIG. 2 is a plan view of a first embodiment of the device, FIG. 3 is a diagrammatic representation of the device in its transporting position FIGS. 4, 5 and 6 are representations of different modifications of the tipper construction and FIG. 7 is a side view of a further embodiment of the reversing device.

The device shown in FIGS. 1 and 2 has a U-shaped frame 80 with the cantilevers 1 and the transverse beam 2, whose width is so dimensioned, that a lorry can enter between the cantilevers 1. In a device for handling freight containers of the standardised length of 20' the length of the cantilevers 1 is approximately 6m and the overall width of the frame approximately 4m.

In order to make it possible for the device to be lined up parallel to a lorry which has been driven in, support rollers are provided on the frame; i.e. two twin-axle rollers 7 at the outer ends of the cantilevers 1 and a transverse roller 8 in the middle of the transverse member 2. Thus, by means of a motorised drive for the transverse roller 8, the device can be turned in the horizontal plane and thus caused to face in the desired direction.

In order to guard against the danger of capsizing, hydraulically extendible base plates 17 are provided at the outer ends. At the corners of the frame 1, 2, corner pillars 3 are provided, at whose upper ends 24 thrust arms 4 are supported for pivoting in a vertical plane. The thrust arms 4 are interconnected by means of a transverse member 5 in the vicinity of their points of rotation, so that they are constrained to parallel pivoting. The transverse member also protects the persons employed in the region of the transverse beam.

At the forward ends 25 of the thrust arms 4, approximately triangular cheeks 6 (hereinafter referred to as tipping cheeks) are supported for pivoting about a horizontal axis 81, the tipping cheek bearings 15 being displaceable at the forward ends 25 of the thrust arms 4 in the axial direction. For such displacement hydraulic actuating cylinders 22 are provided, which engage at consoles 31 of the thrust arms 4.

At the ends of the tipping cheeks 6, rotary locking devices 18, actuable by hydraulic cylinders 23, are provided which engage laterally into the corner fittings of a 20'-container and can there be latched by rotation. In the vicinity of the ends of the tipping cheeks 6, openings are provided for the passage therethrough of any discharge conduits for containers with lateral bulk material discharge or compressed air supply.

In the hollows 26 between the cantilevers 2 and the corner pillars 3, thrust cylinders 9 are anchored, whose piston rods engage joint connections 19 provided substantially centrally of the thrust arms 4. To the joint connections 19 there are also attached tipping cylinders 10 by means of ball joints 16. The piston rods of these tipping cylinders each engage via like ball joints 27 a box-section girder 21 of large cross-section which is firmly welded to the tipping cheek 6 concerned. This enables the tipping cheeks 6 with their bearings 15 to be displaceable in the horizontal direction and nonetheless pivotable through 90° in all positions by means of the tipping cylinder 10 which engages at the joint connection 19. The outer ends of the box-section girders 21 are connected to the bearings 15 via arms 28.

All the control levers 14 for the hydraulically effected operations (engagement, hoisting and pivoting) are located on the transverse beam 2. The latter carries an electric motor or Diesel engine 29 for driving the hydraulic pump and the transverse roller 8 and contains storage tanks for hydraulic oil, as well as all the switching elements.

In order to reduce the space requirement during transportation of the device and during prolonged non-use, the L-shaped side members of the frame, which each comprise a cantilever 1 and a corner pillar 3, are preferably connected to the transverse beam 2 by means of hinges 32. The hinge 32 for one of the cantilevers 1 is attached to the front, and the corresponding hinge 32 for the other cantilever 1 to the rear of the transverse beam 2, so that, after removal of the transverse member 5 which is secured to the arms 4 by bolts 35, the side members, including the parts connected therewith, can be pivoted in the same direction. In this collapsed condition (FIG. 3) the device has a width which takes up little more space than twice the thickness of the transverse beam 2. For commissioning the device, it is only necessary to set the side members at right angles to the transverse beam 2 and to connect them rigidly to the transverse beam by means of any kind of securing means, e.g. brackets 33 and bolts 34, in order to form the L-shaped frame. The transverse member 5 also has to be bolted to the thrust arms 4 by means of the bolts 35. The connection of the hydraulic conduits disposed at the cantilevers 1 and the thrust arms 4 with the conduits extending from the transverse beam 2 is made either with the aid of flexible hoses or by means of plug couplings of the known kind.

The device can be taken to the desired location by means of a strong fork-lift truck. After the entry as hereinbefore described of the lorry laden with a container 11, the device is aligned in a position of axial parallelism by means of the roller 8 and anchored by means of the base plates 17. By raising the thrust arms 4 and slight counter-ajustment by means of the tipping cylinders 10, the rotary locking devices 18 at the ends of the tipping cheeks 6 are then brought to the height of the lateral openings in the lower corner fittings of the container 11 which is standing on the lorry. As soon as this is accomplished, the tipping cheeks are laterally displaced by means of the actuating cylinders 22 engaging the bearings 15 until the rotary locking devices 18 engage in the openings of the corner fittings of the container and can then be latched by remotely controlled hydraulic rotation.

When all the lower corner fittings of the container are engaged by the rotary locking devices and the rotary locking devices of the lorry which engage from below have been disengaged, the container is, by means of the thrust cylinder 9, lifted off the lorry. The latter can now be driven away.

The container may now, as desired, be deposited horizontally on feet or a platform, horizontally on the floor, standing upright on the floor or on a platform of a height of up to 60cm. It is however also possible to set it in any oblique position, and so to maintain it for an indefinite period by closing the appropriate valves.

For discharging bulk material containers, the lower discharge opening 12 in a frontal wall 13 of the obliquely positioned bulk material container 11 is connected to a pneumatic conveyor system via an appropriate silo opening in the floor of the loading chamber or via a hose 30. The transport conduits required for the purpose may extend out from below the cantilevers or from below the transverse beam, since the device has a considerable ground clearance of, for example, 240mm, particularly below the transverse beam 2. Obviously discharging may also take place over the cantilevers or the transverse beam, if the container is raised to a sufficient extent.

A number of modifications of the example described are possible. The tipping cheeks may, for example, be supported rotatably but not slidably displaceably at the front end of the thrust arms and provided below or also above an appropriate rotational bearing 36 with a hinge 37 extending parallel to its longitudinal axis (FIG. 4). The lower portion 38 of each tipping cheek, which is pivotable about this hinge, is then actuated manually or by means of an additional hydraulic cylinder for inserting the rotary locking devices 39 into the lower corner fittings of a container.

In the case of this hinged embodiment it is not necessary to divide the tipping cheeks parallel to their longitudinal axis. The dividing line may also extend in other directions, e.g. vertically, as shown in FIG. 5. Here each tipping cheek is divided into three parts, 40, 41, 42 by hinges 43 provided on either side of the rotary bearing 36. The outer portions 40 and 42 may thus be pivoted manually or hydraulically such that the rotary locking devices 39 can be inserted into the lower corner fittings of a container positioned between the tipping cheeks. The oblique positioning of the rotary locking devices which thereby occurs (and also in the embodiment according to FIG. 4) can be compensated by a tolerance of sufficient magnitude. If desired, it is also possible to achieve parallel positioning by means of further hinges 44 in the vicinity of the rotary locking devices.

In the embodiments so far described, it is possible to accommodate a container only if the latter is positioned precisely parallel to the tipping cheeks and at a quite definite distance from the transverse beam. This entails a lot of shunting and accurate co-operation between the lorry driver and the operator of the reversing device. In order to reduce the consumption of time connected therewith, embodiments were developed, which made the reliable accommodation and hoisting of the container possible even in cases of inaccurate introduction of the container and without altering the position of the reversing device despite lack of parallelism.

For this purpose the rotary locking devices may be moved and presented to the container in a manner which is to a certain extent independent of the position of the cheeks.

A first embodiment of such an arrangement is shown in FIG. 6. Here each tipping cheek consists of a lattice girder 45 which is suspended from the rotary bearing 36 by means of a hinge 46 pivotable about an axis parallel to its longitudinal dimension. The lattice girder 45 consists of an upper boom 47, a lower boom 48 parallel thereto and a plurality of oblique connecting struts 49 between the two booms. A receiving beam 50 extends along the lower boom 48 and can be connected to the lower boom and thus to the lattice girder 45 by means of wart-like stubs 51 extending from the lower boom, which engage in corresponding conical guide openings 52 on the upper side of the receiving beam. The manually or hydraulically actuable rotary locking devices 39 are located at the outer ends of the receiving beam 50.

The ends of the receiving beam 50 are suspended from the ends of the upper boom 47 of the lattice girder by means of arms 53 of adjustable lengths, for universal movement. For this purpose the arms 53 are connected to the upper boom and the receiving beam by means of universal joints 54, 55 and are in the form of telescopic cylinders 57, which can be shortened and lengthened as desired by means of hydraulic connections 56.

The two rotary locking devices thus form the terminal points of a trapezium with lateral limbs of variable lengths. When a container, which has been driven in between the tipping cheeks in an oblique or tilted manner is to be connected, the telescopic cylinders 57 are initially slightly extended (e.g. 500 mm), so that the receiving beam 50 is released from the lower boom 48. The receiving beam 50, which is now freely movable, can readily be directed manually in such a way that the rotary locking devices 39 come into engagement with the lower corner fittings of the container, even where the latter is oblique or tilted. The lattice girder 45 initially remains unchanged in its vertical position. Then the limbs 53 of the trapezium are shortened, so that the container is raised. The rating of the total of four telescopic cylinders 57 should be adequate for hoisting even a non-uniformly loaded container.

In order to guide the container reliably after it has been hoisted, it is desirable that the plane of the cheeks, i.e. the plane of the lattice girder 45, should coincide with the plane of the trapezium. This oblique position is arrived at automatically by reason of the pull exerted by the arms 53 on the upper boom 47, because the axis of rotation defined by the hinge 46 is located at a higher level than the point of application 54 of the telescopic arms.

After adaptation of the plane of the lattice girder to the plane of the trapezium, the telescopic arms 53 may be shortened hydraulically until the stubs 51 engage in the guide openings 52 of the associated receiving beam and thereby effect a rigid connection of the trapezium with the lattice girder. In this connection the tipping cheeks with the container disposed therebetween can be pivoted about the axis of rotation 36.

In this embodiment the point of application 58 of the tipping cylinder is disposed above the rotary bearing 36. Thereby the hinge 46 may be displaced directly below the pivot axis. However, the location of the point of application 58 above the rotary bearing has yet further advantages, which will be explained with reference to the embodiment in FIG. 7.

The device shown in FIG. 7 has a U-shaped frame, which is essentially identical with that according to FIGS. 1 and 2. The side view shows a cantilever 1 and a corner pillar 3. The roller 77 which is provided on the transverse beam (not shown) is in this case made steerable by means of a steering gear 59. Moreover the transverse beam is equipped with an electric motor or Diesel engine providing a propulsion drive for the roller 77. It would also be possible to attach a towing hitch to the transverse beam, so that the device can be transported by a tractor. The tractor may also be used for driving the hoisting- and tipping device by means of a stub shaft of known kind.

The thrust arms 60, which are actuated by the thrust cylinders 9, are here of somewhat different construction from that in FIG. 1, because in this embodiment the tipping cylinders 10 are displaced to a position above the thrust arms. Since, in this case, the tipping cheeks 61 are not displaceable parallel, the jonts 62, 63, via which the thrust cylinders are connected to the thrust arms and the tipping cheeks, have not to be in the form of ball joints. The joints 63 are each applied to an upwardly directed arm 64 of a tipping cheek. Again the tipping cheek bearing 36 is a simple rotary bearing. In similar manner to the embodiment of FIG. 4, the tipping cheeks are in the form of lattice girders having an upper boom 65, a lower boom 66 and struts 67 therebetween, but here the lower boom 66 does not extend parallel to the straight upper boom 65, but approaches the latter from the centre towards the ends, corresponding to the distribution of the bending moment.

At the two ends and at the centre of the lattice girder, eyes 68, 69 are provided for the attachment of wire cables 70, 71. Each half of a tipping cheek is equipped with a wire cable 70 extending vertically from the eye 68 and a wire cable 71 extending from the central eye 69. At the point of connection of the two wire cables a corner element 72 is located which carries a rotary locking device 73 for latching the container. The length of the wire cables 70 and 71 is so chosen that, in the quiescent condition with the upper boom 65 horizontal and the wire cable 70 hanging down vertically, the wire cable 71 is tensioned and the corner element 72 is somewhat below the central eye 69.

The trunnions are doubly supported in the rotary locking devices 73 and have a limited angle of rotation. Rotation is effected by means of keys, tommy bars or handles 78.

Since, thanks to their suspension from wire cables, the corner elements 72 are freely movable in all directions, the rotary locking devices can be effortlessly introduced into the lower corner fittings of a container 75, even if the latter is positioned very obliquely or tilted. The forces which appear during hoisting are transmitted via the vertical wire cables 70 to the ends of the cheeks and are accommodated by the lattice girders. After the container is lifted off its support, it is suspended by the four essentially vertical, now slightly obliquely extending wire cables 70 and is securely guided by the wire cables 71, so that free oscillation is not possible. The tipping movement can then immediately be begun without any further preparation.

During the tipping operation the weight of the container is, depending on its inclination, progressively increasingly accommodated by the lower connecting cable 71 concerned between the corner element and the centre of the cheek. Hence each of these cables has to be dimensioned so as to accommodate the entire container weight plus a margin. For example, in the case of a conventional wire cable material, a cable thickness of 24 mm is adequate for normal 20 - foot containers, whilst the cable thickness of the vertical wire cables 70 may be 16 mm.

When the tipped container approaches the 90° position, the gravity component accommodated by the upper wire cables 70 and 71 in this position decreases progressively, so that finally an unstable equilibrium condition is created. In order to prevent tilting of the container in this position, a catch stirrup 74 is preferably provided between the cheeks, which is positioned over the container prior to the pivoting operation and secured to the cheek end by suitable means. It prevents the container from tilting at a tipping angle approaching 90° and furthermore assists in uniform movement of the tipping cheeks.

The maximum clearance of this catch stirrup should be adapted to the normal height of the container of 8 foot 6 inches; in the case of lower container heights, the catch stirrup may be exchanged for a shorter one or appropriately readjusted. This may for example be effected by suitable folding similarly to an electric current collector or by parallel displacement.

It is also possible to substitute for the catch stirrup a wire cable sling which is suitably secured to the cheeks, or cable elements which are anchored to the upper corner fittings of the container. A further safety measure may reside in conducting the wire cables 70, 71 largely in tubes 76, in order to achieve a measure of resistance to compression for the suspension.

Obviously equivalent means, e.g. chains, could be substituted for the wire cables; in place of the tubes 76 in the last-mentioned case, rods could, for example, also be suitable.

Within the operating range of 90° inwards and 60° outwards, all desired tipping positions can be set continuously and maintained for an indefinite period by closing the appropriate valves. Some container positions are indicated in FIG. 7. The outward tipping movement is made possible by the arrangement of the tipping cylinders above the thrust arms.

It is of course possible, also in the case of the embodiments of the tipping cheeks according to FIGS. 1–5, to achieve a larger tipping range by displaceing the tipping cylinders upwards.

I claim:
1. A lifting and tilting device for freight containers having fittings for engagement by lifting means, said device comprising:
   a. a U-shaped supporting frame having two longitudinal support legs joined at one end by a transverse beam;
   b. two corner pillars mounted at the connecting points of said legs and said transverse beam;
   c. a pair of lifting arms pivotally connected to said corner pillars;
   d. a pair of tilting members pivotally connected to said arms and being provided with engaging means for engaging the fittings of a freight container when said freight container is located between said support legs;
   e. power lifting means for lifting said arms; and
   f. tilting means for tilting said tilting members, said tilting means being pivotally connected to said lifting arms;
said engaging means being movable with respects to said supporting frame in a direction substantially parallel to the pivot axis of the tilting members to accommodate engagement of said engaging means in said fittings, and
   wherein each of said tilting members is constructed of a plurality of tilting member parts, a first of said tilting member parts being pivotally supported at one of said lifting arms, at least one other of said tilting member parts carrying said engaging means and being movable with respect to said first tilting member part.

2. A device according to claim 1, wherein the supporting frame is supported by support means at the ends of the support legs and a support means arranged at the center of the transverse beam.

3. A device according to claim 2, wherein each of the support means comprises at least one roller.

4. A device according to claim 3, wherein the rollers at the ends of the support legs have axes which are parallel to the transverse beam.

5. A device according to claim 4, wherein the support roller or support rollers at the centre of the transverse beam has/have an axis which is perpendicular to the longitudinal axis of the latter.

6. A device according to claim 4, wherein the roller or rollers at the centre of the transverse beam is/are arranged to be steerable.

7. A device according to claim 3, including motorised driving means for the roller or rollers at the centre of the transverse beam.

8. A device according to claim 1, wherein a transverse member connects the lifting arms in the vicinity of their axes of rotation.

9. A device according to claim 1, wherein a thrust cylinder extends from the foot of the corner pillars substantially to the centre of each lifting arm.

10. A device according to claim 1, wherein a joint connection is secured to the center of each lifting arm, the lifting means being actuable at said joint connection on the one hand and a tilting means being connected to each tilting member below its axis of rotation on the other hand.

11. A device according to claim 1, wherein a tilting means is arranged between an upper extension of each lifting arm and an outwardly directed arm of the associated tilting member.

12. A device according to claim 1, wherein each of said tilting members is provided with a pair of spaced engaging means for engagement in respective lower corner fittings of a freight container.

13. A device according to claim 12, wherein the engaging means are in the form of one of manually and hydraulically actuable rotary locking devices.

14. A device according to claim 12, wherein a transverse member is provided for connecting said lifting arms together, said transverse member being disposed adjacent the pivotal connections of said corner pillars and said lifting arms and serving to connect the lifting arms for simultaneous lifting movements about said pivotal connections of said corner pillars and said lifting arms, and wherein said U-shaped supporting frame is substantially horizontally disposed when in an in use position.

15. A device according to claim 14, wherein said power lifting means include a pair of lifting mechanisms, each having a first end connected to lower portions of said supporting frame in the area of said one corner pillars and the other end pivotally connected to one of said lifting arms at a position between the ends of the lifting arm.

16. A device according to claim 15, wherein said lifting arms extend parallel to one another and are pivotally connected to upper ends of respective ones of said corner pillars.

17. A device according to claim 16, wherein the pivot axis of each of said tilting members is situated approximately half-way between its ends.

18. A lifting and tilting device for freight containers having fittings for engagement by lifting means, said device comprising:
   a. a U-shaped supporting frame having two longitudinal support legs joined at one end by a transverse beam;
   b. two corner pillars mounted at the connecting points of said legs and said transverse beam;
   c. a pair of lifting arms pivotally connected to said corner pillars;
   d. a pair of tilting members pivotally connected to said arms and being provided with engaging means for engaging the fittings of a freight container when said freight container is located between said support legs;
   e. power lifting means for lifting said lifting arms; and
   f. tilting means for tilting said tilting members, said tilting means being pivotally connected to said lifting arms;
said engaging means being movable with respect to said supporting frame in a direction substantially parallel to the pivot axis of the tilting members to accommodate engagement of said engaging means in said fittings, and
   wherein the tilting members are pivotable in bearings about a common axis and are horizontally displaceable, together with their bearings in the axial direction.

19. A device according to claim 1, including power-operated displacing means for the tilting members.

20. A device according to claim 18, wherein the tilting means are connected to the lifting arms and the tilting members by ball joints.

21. A lifting and tilting device for freight containers having fittings for engagement by lifting means, said device comprising:
   a. a U-shaped supporting frame having two longitudinal support legs joined at one end by a transverse beam;
   b. two corner pillars mounted at the connecting points of said legs and said transverse beam;
   c. a pair of lifting arms pivotally connected to said corner pillars;
   d. a pair of tilting members pivotally connected to said arms and being provided with engaging means for engaging the fittings of a freight container when said freight container is located between said support legs;
   e. power lifting means for lifting said lifting arms; and
   f. tilting means for tilting said tilting members, said tilting means being pivotally connected to said lifting arms;
said engaging means being movable with respect to said supporting frame in a direction substantially parallel to the pivot axis of the tilting members to accommodate engagement of said engaging means in said fittings, and
   wherein portions of the tilting members are pivotable about axes which are perpendicular to a common tilting member pivot axis.

22. A lifting and tilting device for freight containers having fittings for engagement by lifting means, said device comprising:
   a. a U-shaped supporting frame having two longitudinal support legs joined at one end by a transverse beam;
   b. two corner pillars mounted at the connecting points of said legs and said transverse beam;
   c. a pair of lifting arms pivotally connected to said corner pillars;
   d. a pair of tilting members pivotally connected to said arms and being provided with engaging means for engaging the fittings of a freight container when said freight container is located between said support legs;
   e. power lifting means for lifting said lifting arms; and
   f. tilting means for tilting said tilting members, said tilting means being pivotally connected to said lifting arms;
said engaging means being movable with respect to said supporting frame in a direction substantially parallel to the pivot axis of the tilting members to accommodate engagement of said engaging means in said fittings, and
   wherein each tilting member comprises a girder, which girder is suspended for swinging about an axis which is parallel to its longitudinal dimension, and a receiving beam which is detachably connected to it, and wherein the receiving beam has, at its ends, said engaging means for engaging lower corner fittings of the container, said receiving beam being suspended from the girder at a position below the pivot axis at said tilting member at the lifting arm by means of arms which are movable in any direction and of adjustable length.

23. A lifting and tilting device for freight containers having fittings for engagement by lifting means, said device comprising:
   a. a U-shaped supporting frame having to longitudinal support legs joined at one end by a transverse beam;
   b. two corner pillars mounted at the connecting points of said legs and said transverse beam;
   c. a pair of lifting arms pivotally connected to said corner pillars;
   d. a pair of tilting members pivotally connected to said arms and being provided with engaging means for engaging the fittings of a freight container when said freight container is located between said support legs;
   e. power lifting means for lifting said lifting arms; and
   f. tilting means for tilting said tilting members, said tilting means being pivotally connected to said lifting arms;
said engaging means being movable with respect to said supporting frame in a direction substantially parallel to the pivot axis of the tilting members to accommodate engagement of said engaging means in said fittings,
   wherein each of said tilting members is provided with a pair of spaced engaging means for engagement in respective lower corner fittings of a freight container, and wherein the engaging means are connected by flexible tie members to the center and the ends of the tilting members.

24. A device according to claim 23, wherein the tie members are in the form of wire cables.

25. A device according to claim 23, wherein the central portions of the tie members are in the form of compression members.

26. A device according to claim 23, wherein at least one catch bail interconnecting the tilting members is adapted to be placed around the top of a container.

27. A device according to claim 1, wherein the transverse beam carries driving means for the lifting, turning and tipping means.

28. A device according to claim 27, wherein the transverse beam is equipped with one of an electric motor, a Diesel engine and a stub shaft adapted to be driven by an extraneous power supply.

29. A device according to claim 1, wherein the transverse beam is equipped with one of a self-propulsion drive and a towing hitch.

30. A device according to claim 1, wherein all the operating controls are located on the transverse beam.

31. A device according to claim 1, wherein the longitudinal support legs of said supporting frame are connected to the transverse beam by means of hinges.

32. A device according to claim 22, wherein a transverse member is provided for connecting said lifting arms together, said transverse member being disposed adjacent the pivotal connections of said corner pillars and said lifting arms and serving to connect the lifting arms for simultaneous lifting movements about said pivotal connections of said corner pillars and said lifting arms.

33. A device according to claim 1, wherein a transverse member is provided for connecting said lifting arms together, said transverse member being disposed adjacent the pivotal connections of said corner pillars and said lifting arms and serving to connect the lifting arms for simultaneous lifting movements about said pivotal connections of said corner pillars and said lifting arms.

34. A device according to claim 33, wherein said transverse member is disposed sufficient horizontally spaced from the pivotal connection of said lifting arms and tilting members and intermediate said last-mentioned pivotal connection and pivotal connections of the lifting arms and corner pillars so as to permit lifting and tilting of a freight container in both rotational directions from a horizontal position.

35. A device according to claim 1, wherein said lifting arms extend parallel to one another and are pivotally connected to upper ends of respective ones of said corner pillars.

36. A device according to claim 1, wherein the pivot axis of each of said tilting members is situated approximately half-way between its ends.

37. A device according to claim 1, wherein said engaging means include means insertable into laterally open openings at the sides of a freight container to lockingly connected said tilting members with said freight container.

38. A device according to claim 37, wherein each of said tilting members is provided with a pair of spaced engaging means for engagement in respective lower corner fittings of a freight container.

39. A device according to claim 21, wherein the pivot axis of each of said tilting members is situated approximately half-way between its ends.

40. A lifting and tilting device for freight containers having fittings for engagement by lifting means, said device comprising:
 a. a U-shaped supporting frame having two longitudinal support legs joined at one end by a transverse beam;
 b. two corner pillars mounted at the connecting points of said legs and said transverse beam;
 c. a pair of lifting arms pivotally connected to said corner pillars;
 d. a pair of tilting members pivotally connected to said arms and being provided with engaging means for engaging the fittings of a freight container when said freight container is located between said support legs;
 e. power lifting means for lifting said lifting arms; and
 f. tilting means for tilting said tilting members, said tilting means being pivotally connected to said lifting arms;
said engaging means being movable with respect to said supporting frame in a direction substantially parallel to the pivot axis of the tilting members to accommodate engagement of said engaging means in said fittings, and
 wherein the longitudinal support leg and corner pillar at one end of said transverse beam are hingedly connected to one corner of said transverse beam and the other longitudinal support leg and corner pillar are hingedly connected to the diagonally opposite corner of said transverse beam, whereby said device can be converted to a travel position with said transverse beam and said longitudinal support legs extending parallel to one another.

41. A device according to claim 21, wherein each of said tilting members are attached to respective ones of said lifting arms by moving means for moving said tilting members with respect to said lifting arms in the direction of the pivot axis for said tilting members.

42. A device according to claim 41, wherein said moving means include hydraulic cylinder means having one end connected to a lifting arm and the other end connected to a tilting member.

43. A device according to claim 1, wherein said engaging means are suspended by cable means from said first tilting member parts.

44. A device according to claim 22, wherein hydraulic means are provided for adjusting the length of said last-mentioned arms.

45. A lifting and tilting device for freight containers of the type having fittings at the sides thereof for engagement by container handling means, said device comprising:
 a supporting frame,
 a pair of lifting arms carried by lifting movements by said supporting frame,
 and a pair of tilting means pivotally attached one each to said lifting arms,
wherein each of said tilting means includes
 a first portion pivotally carried at one of said lifting arms,
 a second portion carried by said first portion, said second portion being constructed as a girder with an upper boom and a lower boom rigidly connected to one another,
 a receiving beam including fitting engaging means for engaging fitting means of a container when said container is disposed between said lifting arms, said receiving beam including beam locking means for selectively locking said receiving beam to said lower boom, adjustable length arm means carried by said upper boom and being attached to said receiving beam for moving said receiving beam between a locking position with said beam locking devices locking said receiving beam to said lower boom and free positions away from said beam locking devices to facilitate free movement of said receiving beam with respect to said girder when said fitting engaging means are being connected to said fitting means of a container.

46. A device according to claim 45, wherein said adjustable length arm means are connected to said upper boom and said receiving beam by universal joint means.

47. A device according to claim 46, wherein said adjustable length arm means include hydraulic cylinder means for lifting said receiving beam to said locking position with a container attached thereto by said fitting means.

48. A device according to claim 47, wherein said first and second portions are hingedly connected to one another with hinge means having a hinge axis parallel to said booms.

49. A device according to claim 48, further comprising power tilting means for applying tilting force to said tilting means at a position above the pivotal connection of the tilting means and lifting arms.

50. A device according to claim 45, wherein each of said receiving means includes two fitting engaging means spaced from one another to engage in lower corner fittings of a container.

* * * * *